(12) United States Patent
Hsu

(10) Patent No.: US 7,626,807 B2
(45) Date of Patent: Dec. 1, 2009

(54) DISPLAY DEVICE CAPABLE OF PROTECTING A DISPLAY PANEL

(75) Inventor: Ying-Chun Hsu, Taipei (TW)

(73) Assignee: Askey Computer Corp., Chung-Ho, Taipei (TW)

( * ) Notice: Subject to any disclaimer, the term of this patent is extended or adjusted under 35 U.S.C. 154(b) by 298 days.

(21) Appl. No.: 11/745,417

(22) Filed: May 7, 2007

(65) Prior Publication Data
US 2008/0170357 A1      Jul. 17, 2008

(30) Foreign Application Priority Data
Jan. 17, 2007 (TW) .............................. 96101732 A

(51) Int. Cl.
H05K 5/00 (2006.01)
H05K 7/00 (2006.01)

(52) U.S. Cl. .............................. 361/679.21; 361/679.22; 361/679.26; 361/679.29; 361/679.3

(58) Field of Classification Search ................. 361/681, 361/679.21, 679.22, 679.26, 679.29, 679.3
See application file for complete search history.

(56) References Cited

U.S. PATENT DOCUMENTS

| | | | | |
|---|---|---|---|---|
| 5,155,627 A * | 10/1992 | Keehn et al. | ................. | 359/609 |
| 5,464,214 A * | 11/1995 | Griffin | ..................... | 273/148 B |
| 5,905,550 A * | 5/1999 | Ohgami et al. | ................. | 349/58 |
| 5,946,061 A * | 8/1999 | Kurihara et al. | ................ | 349/58 |
| 5,963,421 A * | 10/1999 | Moss et al. | ............ | 361/679.21 |
| 6,317,316 B1 * | 11/2001 | Bentley et al. | .......... | 361/679.22 |
| 6,494,429 B2 * | 12/2002 | Tajima | ........................ | 248/473 |
| 6,507,377 B1 * | 1/2003 | Jung | ............................ | 349/60 |
| 6,507,484 B2 * | 1/2003 | Fukuyoshi | ............. | 361/679.26 |
| 6,559,907 B1 * | 5/2003 | Byoun | ......................... | 349/58 |
| 6,611,302 B1 * | 8/2003 | Ueda et al. | .................... | 349/58 |
| 6,812,976 B2 * | 11/2004 | Satonaka | ..................... | 349/58 |
| 6,838,810 B1 * | 1/2005 | Bovio et al. | ................. | 313/422 |
| 6,891,718 B2 * | 5/2005 | You et al. | .............. | 361/679.21 |
| 6,989,986 B2 * | 1/2006 | Kumagai et al. | ....... | 361/679.27 |
| 7,002,792 B2 * | 2/2006 | Han et al. | .............. | 361/679.21 |
| 7,209,195 B2 * | 4/2007 | Lin | .............................. | 349/58 |
| 7,271,861 B2 * | 9/2007 | Yamazaki | ..................... | 349/58 |
| 7,405,925 B2 * | 7/2008 | Sung | ..................... | 361/679.27 |
| 7,576,975 B2 * | 8/2009 | Tai et al. | ................. | 361/679.21 |
| 2002/0181188 A1 * | 12/2002 | You et al. | .................... | 361/681 |
| 2004/0150943 A1 * | 8/2004 | Rock | ........................... | 361/681 |
| 2004/0156168 A1 * | 8/2004 | LeVasseur et al. | .......... | 361/681 |

* cited by examiner

*Primary Examiner*—Jayprakash N Gandhi
*Assistant Examiner*—Anthony M Haughton
(74) *Attorney, Agent, or Firm*—Winston Hsu

(57) ABSTRACT

A fixing device includes a housing, a bezel, and a rib structure. The housing has a first side. The bezel is connected to the housing for covering the flat structure with the housing. The bezel has a second side and a third side. The rib structure is disposed outside the flat structure and is located between the first side of the housing and the second side of the bezel for keeping a gap between the second side of the bezel and the flat structure.

24 Claims, 5 Drawing Sheets

DISPLAY DEVICE CAPABLE OF PROTECTING A DISPLAY PANEL

BACKGROUND OF THE INVENTION

1. Field of the Invention

The present invention relates to a display device, and more specifically, to a display device capable of protecting a display panel.

2. Description of the Prior Art

With improvement of technology, light, thin, power-saving, and portable electronic products have become more and more popular, such as mobile phones, PDAs (Personal Digital Assistant), and notebooks. LCD (Liquid Crystal Display) panels play an important role in these electronic products, and have gradually replaced CRT (Cathode Ray Tube) display devices. An LCD panel consists of a color filter baseboard, a thin-film transistor baseboard, and a liquid crystal material layer stuffed between the color filter baseboard and the thin-film transistor baseboard. All of the said components are breakables, so adding a breakproof design into the LCD panel structure is necessary.

Please refer to FIG. 1. FIG. 1 is a sectional diagram of a display device 10 according to the prior art. The display device 10 comprises a display panel 12, a bezel 14, a housing 16, and a pad 18. The housing 16 is disposed at a side of the display panel 12, and the bezel 14 is disposed at another side of the display panel 12 and is connected to the housing 16 for covering the display panel 12 with the housing 16. The pad 18 is disposed between the display panel 12 and the bezel 14 for protecting the display panel 12 when the display device 10 falls down. This is a common protection method in liquid crystal related products. However, if the display device 10 is impacted excessively, the display panel 12 will still break. Therefore, this method is not good enough. Another method involves disposing a see-through glass on the display panel 12 for further protection. However, the see-through glass must be in tight contact with the display panel 12 to prevent refraction and dust. In such a manner, impact force can still be conducted from the display device 10 to the display panel 12 to break the display panel 12.

SUMMARY OF THE INVENTION

Therefore, the present invention provides a display device capable of protecting a display panel to solve the problem mentioned above.

The present invention provides a fixing device for protecting a flat structure comprising a housing having a first side; a bezel connected to the housing for covering the flat structure with the housing, the bezel having a second side and a third side; and a rib structure disposed outside the flat structure and located between the first side of the housing and the second side of the bezel for keeping a gap between the second side of the bezel and the flat structure.

The present invention further provides a display device for protecting display panels comprising a display panel; a housing disposed at a side of the display panel, the housing having a first side; a bezel disposed at another side of the display panel and connected to the housing for covering the display panel with the housing, the bezel having a second side and a third side; and a rib structure disposed outside the display panel and located between the first side of the housing and the second side of the bezel for keeping a gap between the second side of the bezel and the display panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
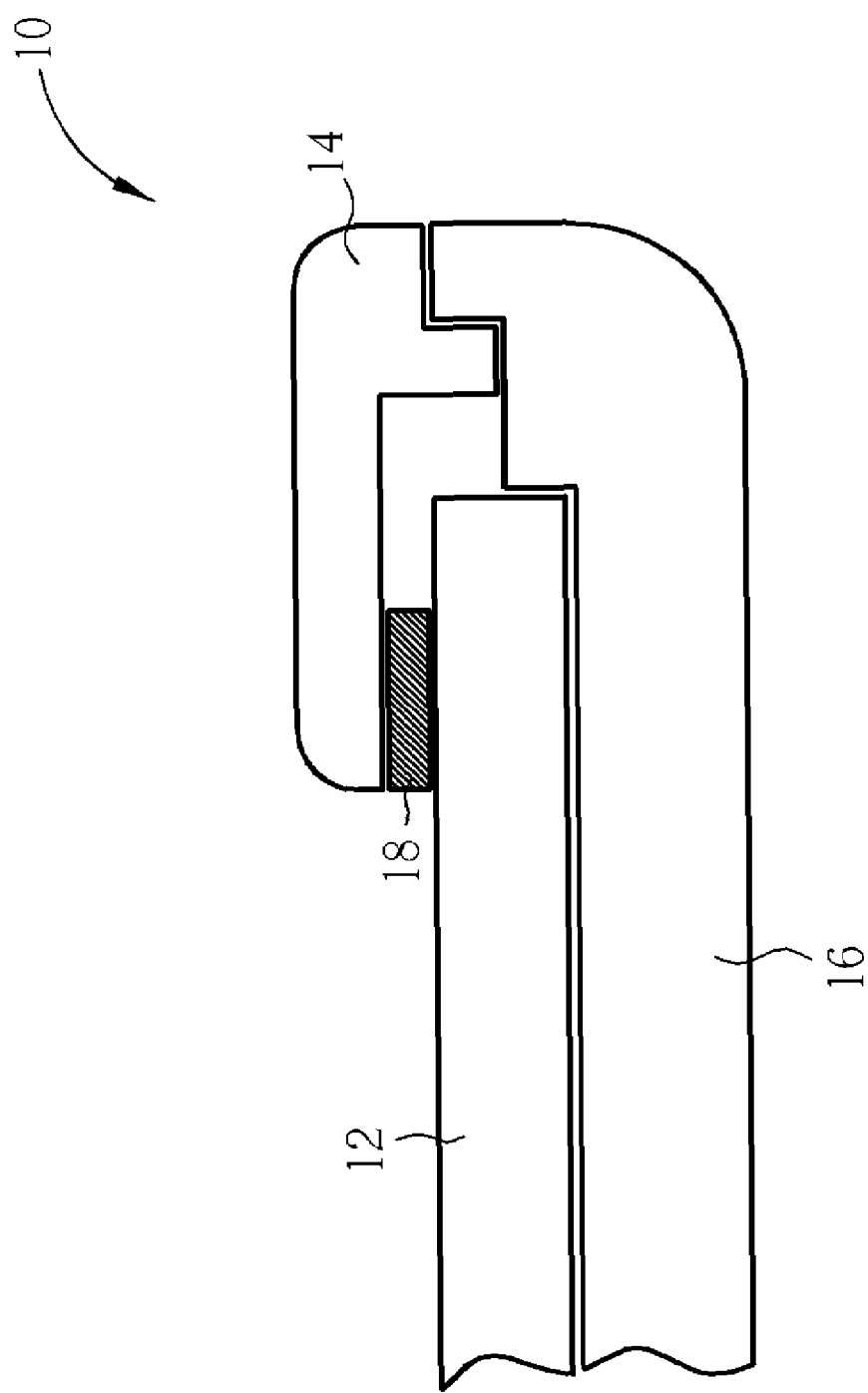
FIG. 1 is a sectional diagram of a display device according to the prior art.
Figure 2:
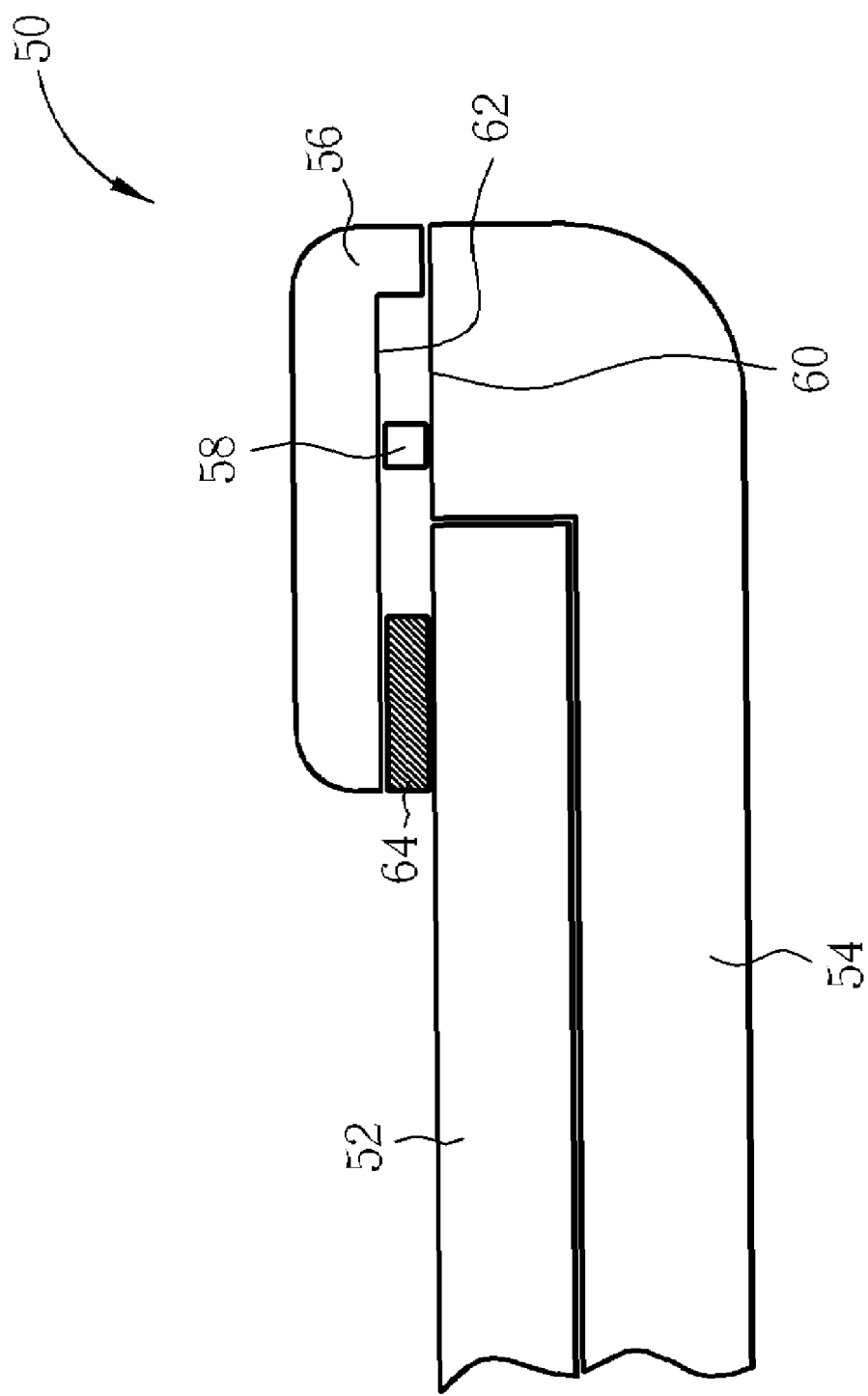
FIG. 2 is a sectional diagram of a display device according to a first embodiment of the present invention.

Please refer to FIG. 2. FIG. 2 is a sectional diagram of a display device 50 according to a first embodiment of the present invention. The display device 50 comprises a display panel 52, a housing 54, a bezel 56, and a rib structure 58. The housing 54 is disposed at a side of the display panel 52. The housing 54 has a first side 60. The bezel 56 is disposed at another side of the display panel 52 and is connected to the housing 54 for covering the display panel 52 with the housing 54. The bezel 56 has a second side 62. The rib structure 58 is disposed outside the display panel 52 and is located between the first side 60 of the housing 54 and the second side 62 of the bezel 56 for keeping a gap between the second side 62 of the bezel 56 and the display panel 52. The display device 50 can further comprise a pad 64 in the gap. The pad 64 is disposed between the second side 62 of the bezel 56 and the display panel 52 so as to prevent particles, such as dust, from entering into the display device 50. Furthermore, the display device 50 can conduct impact force through the rib structure 58 while striking the ground. In all impact conditions where the display device 50 falls to the ground, impacting the surface of the bezel 56 damages the display panel 52 most easily. If the bezel 56 hits the ground first when the display device 50 falls to the ground, the impact force is absorbed by the bezel 56, and is then conducted from the rib structure 58 to the housing 54. Therefore, the impact force will not pass through the display panel 52 directly. Additionally, the housing 54 and the bezel 56 are usually made of plastic or magnalium material. And, the rib structure 58 is made of hard material. That is to say, material of the rib structure 58 can be the same as material of the housing 54 and the bezel 56, or can be another hard material to prevent deformation of the rib structure 58 while bearing the impact force.

Figure 3:
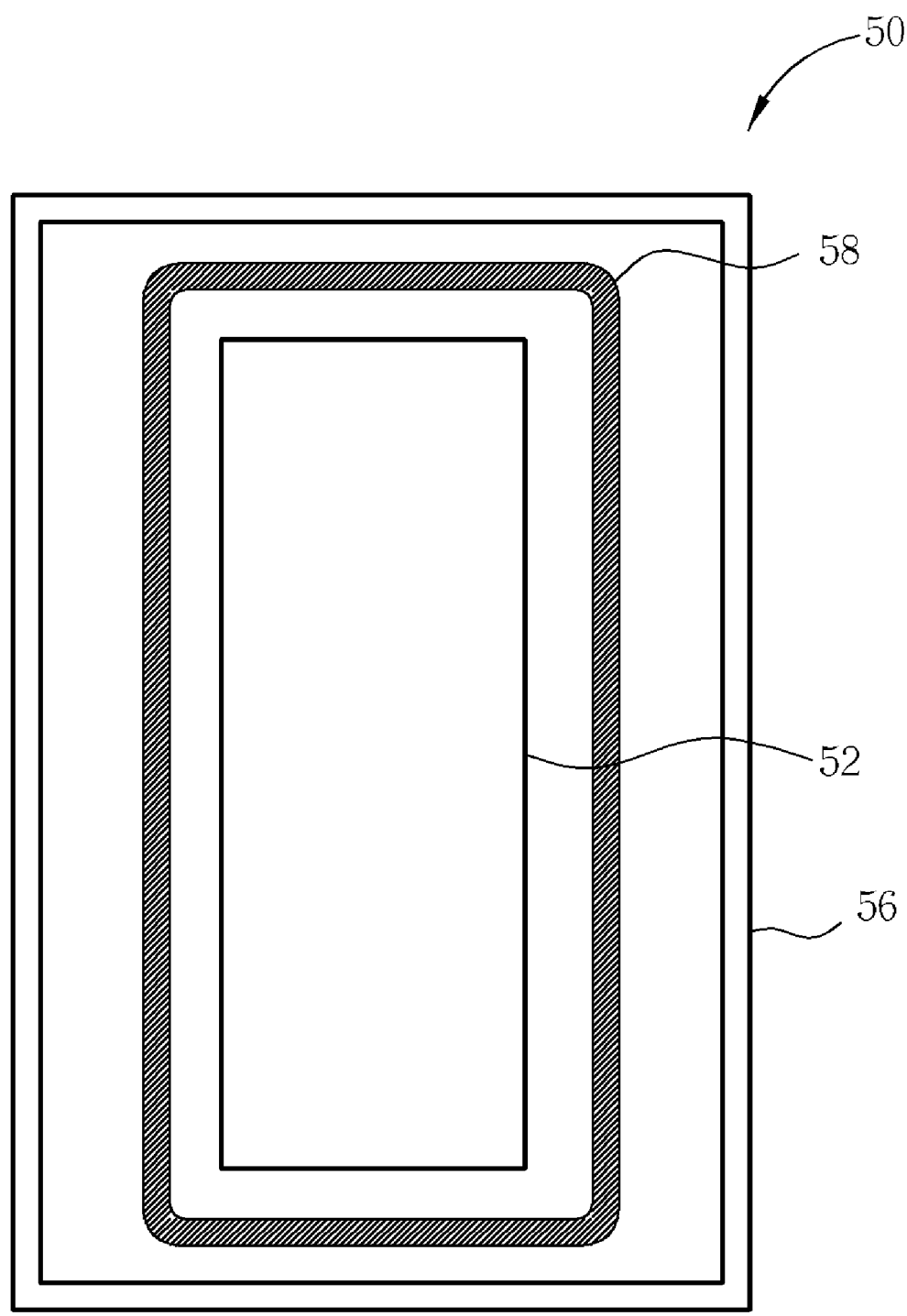
FIG. 3 is a sectional top-view diagram of the display device in FIG. 2.
Figure 4:
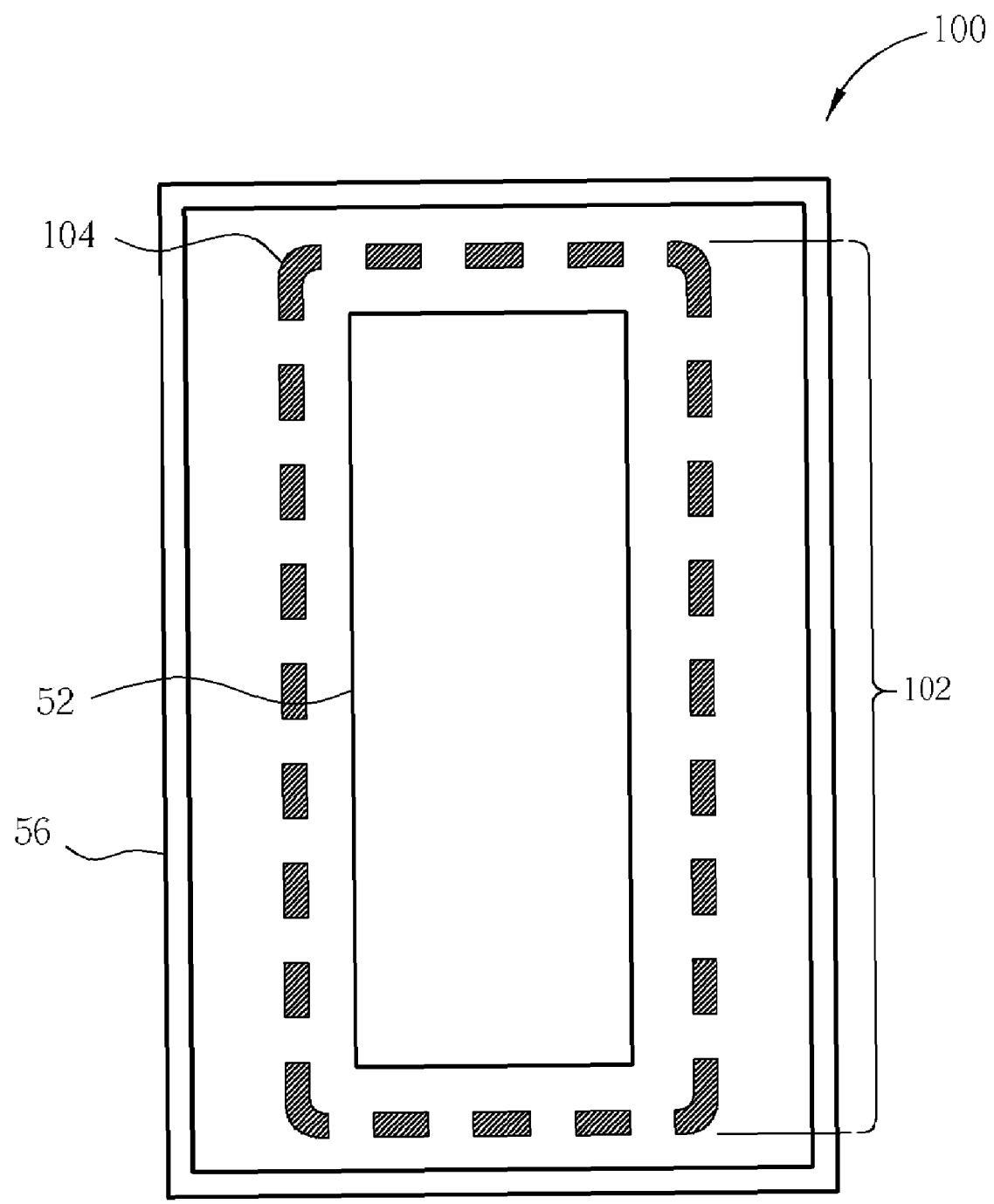
FIG. 4 is a sectional top-view diagram of a display device according to a second embodiment of the present invention.

It should be mentioned that the rib structure 58 can be connected to the first side 60 of the housing 54 or the second side 62 of the bezel 56 to create a monolithic structure, or can be an independent structure located between the first side 60 of the housing 54 and the second side 62 of the bezel 56. Additionally, please refer to FIG. 3. FIG. 3 is a sectional top-view diagram of the display device 50 in FIG. 2. The rib structure 58 can be a ring rib structure disposed around the outside of the display panel 52. The design and the arrangement of the rib structure 58 are not limited to the way shown in FIG. 3. Please refer to FIG. 4. FIG. 4 is a sectional top-view diagram of a display device 100 according to a second embodiment of the present invention. A difference between the display device 50 in the first embodiment and the display device 100 is design of the rib structure. Components mentioned in both the first and second embodiments represent components with similar functions or similar positions. The display device 100 comprises a rib structure 102. The rib structure 102 comprises a plurality of ribs 104. The plurality of ribs 104 is disposed around the outside of the display panel 52 in a discontinuous manner to save material cost.

Figure 5:
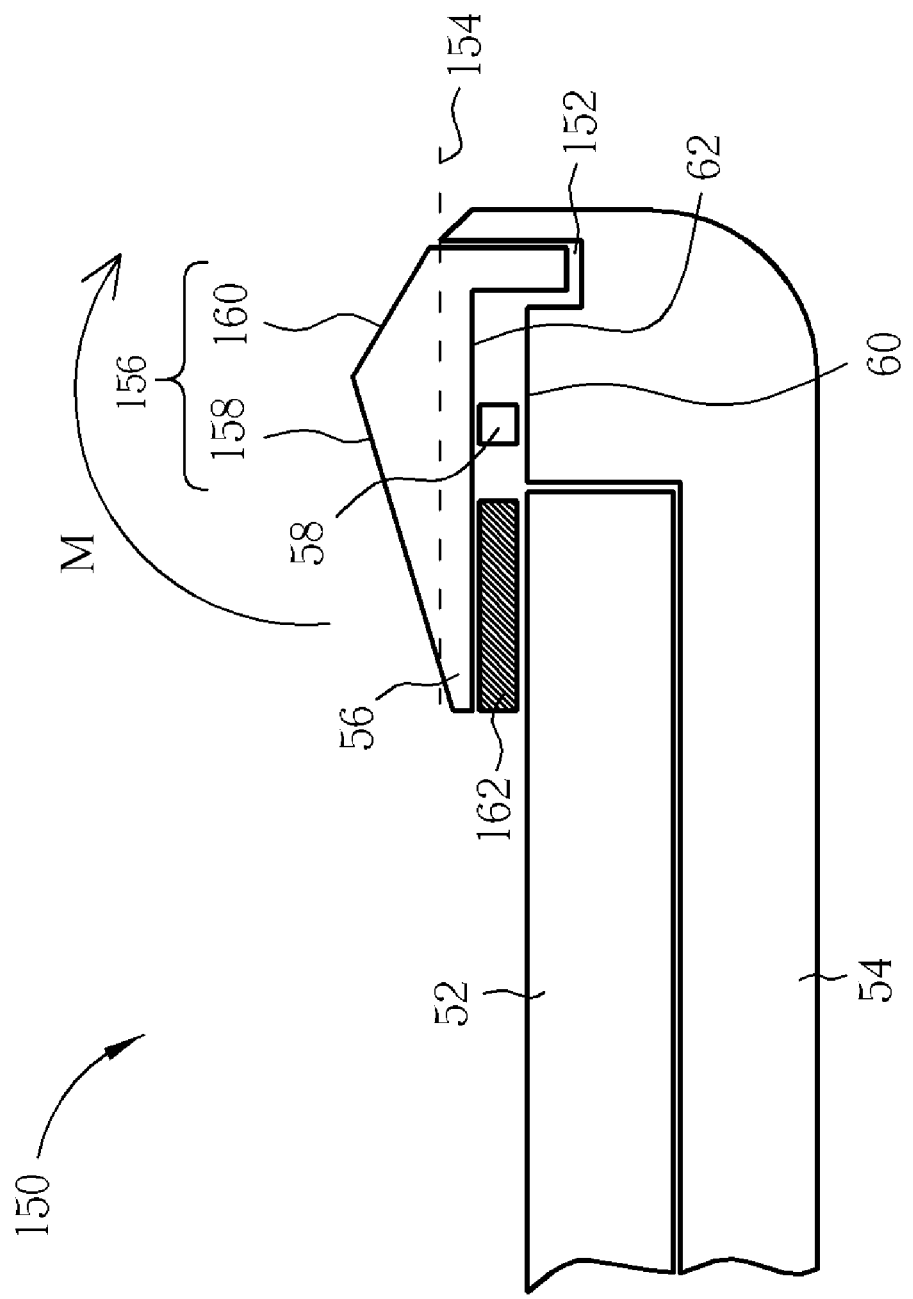
FIG. 5 is a sectional diagram of a display device according to a third embodiment of the present invention.

Please refer to FIG. 5. FIG. 5 is a sectional diagram of a display device 150 according to a third embodiment of the present invention. Differences between the display device 50 in the first embodiment and the display device 150 include a protruding structure and a groove. Components mentioned in both the first and third embodiments represent components with similar functions or similar positions. The first side 60 of the housing 54 has a groove 152. The bezel 56 is engaged with the groove 152. The groove 152 is used for supplying the bezel 56 with a space so as to allow the bezel 56 to rotate pivotally with the rib structure 58. The bezel 56 has a third side 154. The third side 154 has a protruding structure 156. The protruding structure 156 comprises a first incline 158 and a second incline 160. The first incline 158 and the second incline 160 have a common border located outside the rib structure 58. In such a manner, if the bezel 56 hits the ground first as the display device 150 falls to the ground, the impact force will not only be absorbed by the bezel 56 and then conducted from the rib structure 58 to the housing 54, but will also be exerted on the protruding structure 156 to form a torque M on the bezel 56 that takes the rib structure 58 as a pivot. The torque M makes the bezel 56 rotate pivotally with the rib structure 58. That is to say, an end of the second side 62 close to the display panel 52 is rotated away from the display panel 52 due to the torque M for further preventing the display panel 52 from being hit by the bezel 56. Additionally, the design and the arrangement of the rib structure according to the second embodiment can also be applied to the protruding structure mentioned in the third embodiment. For example, the protruding structure 156 can also be a ring rib structure disposed around the outside of the rib structure 58, or can comprise a plurality of protruding portions disposed around the outside of the rib structure 58 in a discontinuous manner and corresponding to the plurality of ribs 64, respectively. The display device 150 can further comprise a pad 162 disposed between the second side 62 of the bezel 56 and the display panel 52.

Compared with the prior art, the present invention utilizes the rib structure to conduct impact force exerted upon the display device away from the display panel. If the bezel hits the ground first while the display device falls to the ground, impact force will not only be absorbed by the bezel and then conducted from the rib structure to the housing, but will also be exerted on the protruding structure to form a torque M on the bezel that takes the rib structure as a pivot. Then, an end of the bezel close to the display panel is rotated away from the display panel due to the torque M. In such a manner, more perfect protection for the display panel is provided, because the possibility of the display panel being hit by the bezel or directly by impact force is reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fixing device for protecting a flat structure comprising:
   a housing having a first side, the first side of the housing having a groove;
   a bezel connected to the housing for covering the flat structure with the housing, the bezel having a second side and a third side, the bezel being engaged with the groove; and
   a rib structure disposed outside and not overlapping with the flat structure and located between the first side of the housing and the second side of the bezel for keeping a gap between the second side of the bezel and the flat structure, the third side of the bezel having a protruding structure disposed outside the rib structure, the protruding structure having a first incline and a second incline, the first incline and the second incline having a common border located outside the rib structure.

2. The fixing device of claim 1, wherein the rib structure comprises a plurality of ribs disposed outside the flat structure in a discontinuous manner.

3. The fixing device of claim 2, wherein the plurality of ribs are disposed around the outside of the flat structure in a discontinuous manner.

4. The fixing device of claim 1, wherein the rib structure is a ring rib structure disposed around the outside of the flat structure.

5. The fixing device of claim 1, wherein the rib structure is connected to the second side of the bezel to create a monolithic structure.

6. The fixing device of claim 1, wherein the rib structure is connected to the first side of the housing to create a monolithic structure.

7. The fixing device of claim 1, wherein the protruding structure comprises a plurality of protruding portions disposed outside the rib structure in a discontinuous manner.

8. The fixing device of claim 7, wherein the plurality of protruding portions are disposed around the outside of the rib structure in a discontinuous manner.

9. The fixing device of claim 1, wherein the protruding structure is a ring protruding structure disposed around the outside of the rib structure.

10. The fixing device of claim 1 further comprising a pad disposed between the second side of the bezel and the flat structure.

11. The fixing device of claim 1, wherein the rib structure is made of hard material.

12. The fixing device of claim 11, wherein the rib structure is made of plastic or magnalium material.

13. A display device for protecting display panels comprising:
   a display panel;
   a housing disposed at a side of the display panel, the housing having a first sides, the first side of the housing having a groove;
   a bezel disposed at another side of the display panel and connected to the housing for covering the display panel with the housing, the bezel having a second side and a third side, the bezel being engaged with the groove; and
   a rib structure disposed outside and not overlapping with the display panel and located between the first side of the housing and the second side of the bezel for keeping a gap between the second side of the bezel and the display panels, the third side of the bezel having a protruding structure disposed outside the rib structure, the protruding structure having a first incline and a second incline, the first incline and the second incline having a common border located outside the rib structure.

14. The display device of claim 13, wherein the rib structure comprises a plurality of ribs disposed outside the display panel in a discontinuous manner.

15. The display device of claim 14, wherein the plurality of ribs are disposed around the outside of the display panel in a discontinuous manner.

16. The display device of claim 13, wherein the rib structure is a ring rib structure disposed around the outside of the display panel.

17. The display device of claim 13, wherein the rib structure is connected to the second side of the bezel to create a monolithic structure.

18. The display device of claim 13, wherein the rib structure is connected to the first side of the housing to create a monolithic structure.

19. The display device of claim 13, wherein the protruding structure comprises a plurality of protruding portions disposed outside the rib structure in a discontinuous manner.

20. The display device of claim 19, wherein the plurality of protruding portions are disposed around the outside of the rib structure in a discontinuous manner.

21. The display device of claim 13, wherein the protruding structure is a ring protruding structure disposed around the outside of the rib structure.

22. The display device of claim 13 further comprising a pad disposed between the second side of the bezel and the display panel.

23. The display device of claim 13, wherein the rib structure is made of hard material.

24. The display device of claim 23, wherein the rib structure is made of plastic or magnalium material.

* * * * *